United States Patent [19]

Regelson et al.

[11] 4,117,967
[45] Oct. 3, 1978

[54] SOLDER EXTRACTOR APPARATUS

[75] Inventors: Ephraim Regelson, Kensington, Md.; Leonard G. Terral, China Lake, Calif.; Ronald J. Matusiak, El Cajon, Calif.; Jerry L. Trotter; William L. Rea, both of San Diego, Calif.; Edward L. Mangel, Poway, Calif.

[73] Assignee: The United States of America as represented by the Secretary of the Navy, Washington, D.C.

[21] Appl. No.: 800,972

[22] Filed: May 26, 1977

[51] Int. Cl.[2] ............ B23K 3/00; F04B 37/10; F04B 39/12
[52] U.S. Cl. ................ 228/20; 137/596.17; 228/57; 417/239; 417/505
[58] Field of Search ........... 228/20, 57; 173/168; 417/505, 239; 137/596.17; 200/61.58 R

[56] References Cited

U.S. PATENT DOCUMENTS

| 1,234,850 | 7/1917 | Zimmer | 417/239 |
| 1,880,595 | 10/1932 | Tursky | 417/239 |
| 3,163,145 | 12/1964 | Duhaime et al. | 228/20 |
| 3,213,537 | 10/1965 | Balamuth et al. | 32/58 X |
| 3,411,594 | 11/1968 | Siegel | 228/20 X |
| 3,904,841 | 9/1975 | Swatman | 200/61.58 R |

Primary Examiner—James L. Jones, Jr.
Assistant Examiner—K. J. Ramsey
Attorney, Agent, or Firm—R. S. Sciascia; G. J. Rubens

[57] ABSTRACT

A solder extractor apparatus is configured as a self-contained bench unit having a pump motor to provide an instantaneous source of pressure or vacuum available to the operator from a common port on the apparatus, the pump being started by the operator when he lifts the solder extractor iron from its support holder, and thereafter, the use of the pressure or vacuum being controlled by a foot operated switch so as to be available at the appropriate time in the solder extraction process.

8 Claims, 6 Drawing Figures

4,117,967

SOLDER EXTRACTOR APPARATUS

BACKGROUND OF THE INVENTION

This invention relates to solder extractor apparatus and more particularly to such extractor apparatus which has an improved operator's control to expedite the solder extraction operation.

Apparatus currently available similar to the present invention is represented by U.S. Pat. No. 3,411,594 issued on Nov. 19, 1968. In this patented device the motor-pump assembly is controlled by an operator's foot pedal switch independently of the solder extractor iron. As a result, the vacuum or pressure is not effectively available at the point of the solder extraction until the pump-motor has reached operating speed after the soldered connection has been melted. In addition, the vacuum and pressure is available at separate ports, requiring the operator physically to unplug and replug the hydraulic line between the respective ports on the front chassis panel.

SUMMARY OF THE INVENTION

Instantaneous and expeditious response by the novel solder extractor unit is made possible by controlling the operation of the motor-pump through the operator's manual manipulation of the solder extractor iron and his subsequent separate control over the presence of pressure or the vacuum by a foot switch.

The motor-pump will continue to provide readily available pressure and vacuum at all times the solder extractor iron is in use, independently of any other action, i.e., the operator's depressing a foot pedal. Thus, no lost time is experienced waiting for the build-up of pressure or vacuum by the activated motor-pump. Also the pressure/vacuum can be made available only at the appropriate time when the soldered joint is melted, and not before, which may otherwise serve to cool the melted solder before it can be completely extracted. In addition, the pressure and vacuum outputs of the motor-pump assembly are each provided with respective solenoid operated valves leading to a common port on the front cabinet panel.

The solder extractor apparatus cabinet is also provided with a plurality of electrical outlets, each provided with a variable temperature control for the electrical tool connected thereto. Such an outlet is provided on opposite sides on the front cabinet panel capable of interchangeably accommodating either of the electrical tools as a convenience for left and right handed persons.

A manual toggle switch is provided for selecting either the pressure or the vacuum that is to be available at the common port, the control being provided by an operator's foot switch so as to free both of the operator's hands.

STATEMENT OF THE OBJECTS OF THE INVENTION

A principal object of this invention is to provide a solder extractor apparatus that will enable the solder extraction operation to be carried out more efficiently, expeditiously, and conveniently to left hand and right hand operators.

Other objects, advantages and novel features of the invention will become apparent from the following detailed description of the invention when considered in conjunction with the accompanying drawings.

DESCRIPTION OF THE PREFERRED EMBODIMENT

Figure 1:
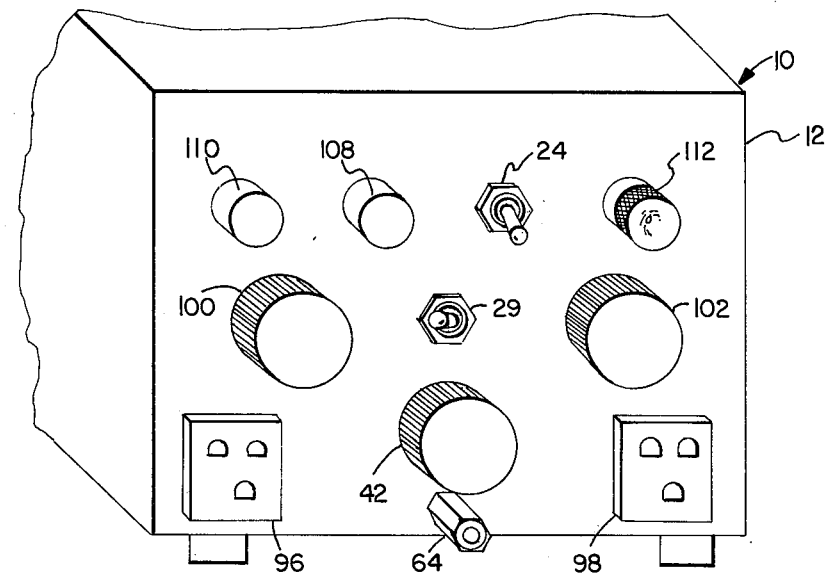
FIG. 1 is a front perspective view of the novel solder extractor apparatus.
Figure 2:
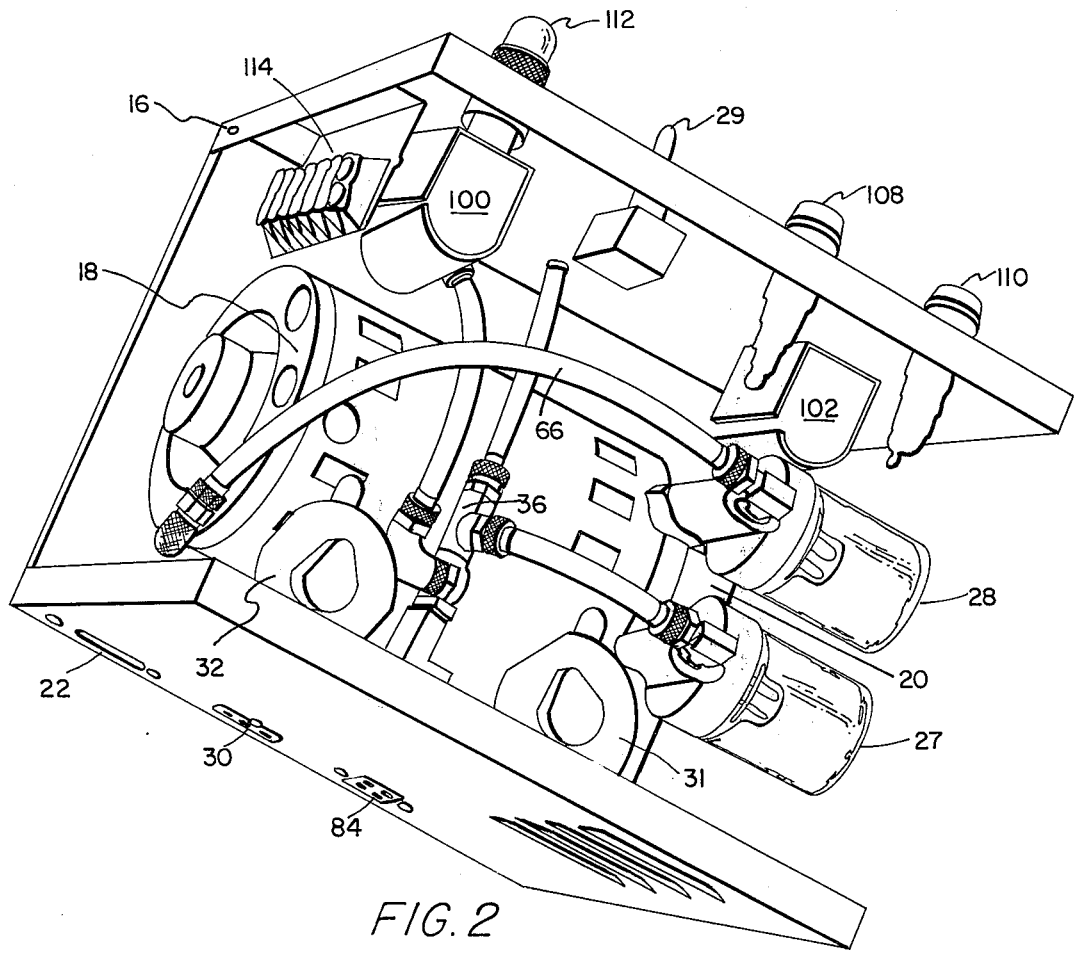
FIG. 2 is a top perspective view of the novel solder extractor apparatus with the enclosure cover removed to show the interior arrangement of the components.
Figure 3:
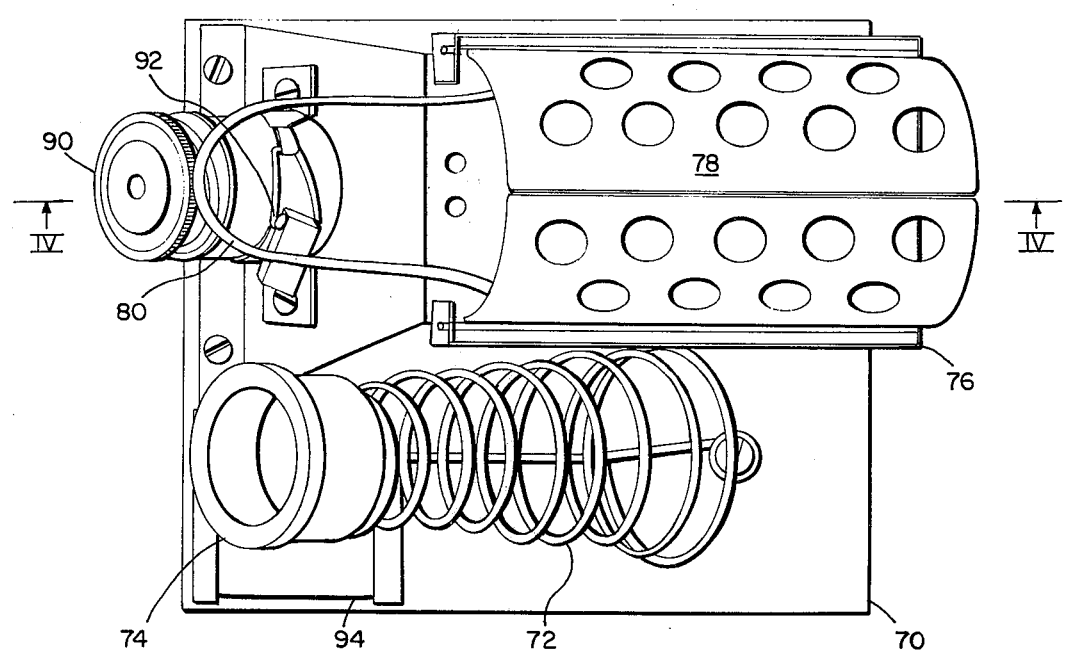
FIG. 3 is a top view of a separate solder extractor iron and solder iron holder unit.

Referring to the drawing where like reference numerals refer to similar parts throughout the figures there is shown in FIGS. 1 and 2 a novel solder extractor apparatus 10 provided with a chassis 12 and a chassis handle 14 to provide portability as a bench-type unit. A removable side panel 15 provides access to the components within the enclosure. Mounted on the chassis is a safety interlock switch 16 which is opened when side panel 15 is removed to shut-off the power to the components. A solder extractor iron holder 17 shown in FIG. 3 is associated with extractor apparatus 10 as a separate unit, being electrically connected thereto in a manner to be described.

Extractor apparatus includes a 115-V AC motor 18, approximately ⅛ HP, and an associated driven pump 20. Motor 18 is energized from a socket 22 located at the rear panel of the chassis, and controlled by a main switch 24 located in the front panel of the chassis. The electrical circuitry of the extractor apparatus will be described with reference to FIG. 6.

Figure 5:
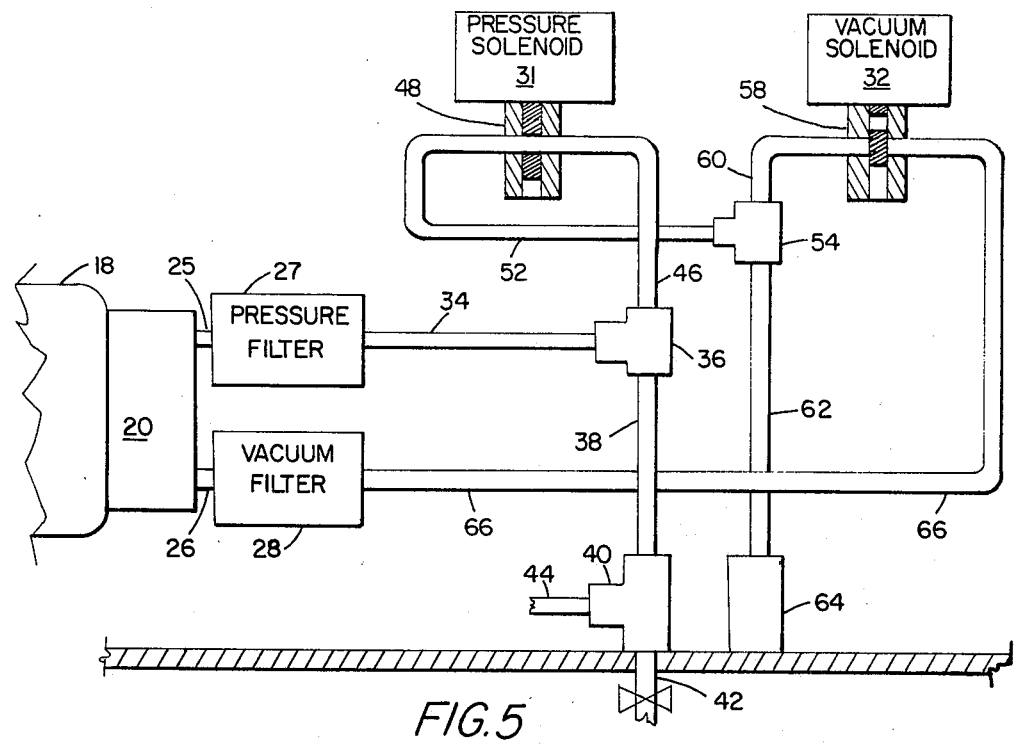
FIG. 5 is a hydraulic circuit diagram for the vacuum and pressure systems of the solder extractor apparatus.

As shown in FIGS. 2 and 5, pump 20 is provided with two outlet ports, namely, a pressure outlet port 25 and a vacuum outlet port 26, each port connected to a respective air filter 27 and 28. Pressure or vacuum is alternatively selected by the operator by a manual toggle switch 29 mounted on the front chassis panel. The delivery of the selected pressure or vacuum at the tip of the solder extractor iron, not illustrated, is controlled by an operator's foot switch 30 through a pair of solenoids 31 and 32, respectively. Pressure outlet 25 is connected by hyraulic line 34 via air filter 27 to a T-connector 36. Line 38 from connector 36 extends to a pressure control valve 40 mounted to the inside of front chassis panel, and which is variably controlled by a pressure valve knob (FIG. 1) 42 accessible to the operator on the front chassis panel. Valve 40 has an air vent 44, and the pressure (0 to 25 psi) delivered to the solder extract tip depends on the amount of pressure dissipated through vent 44 by operator's adjustment of knob 42.

The other hydraulic line 46 from T-connector 36 is directed to a pressure solenoid valve 48 positioned by pressure solenoid 31. As illustrated in FIG. 5, solenoid 31 is in an energized condition positioning its valve 48 open, because toggle switch 29 has been thrown to its "pressure" position and foot operated switch 30 is depressed. Thus, pressure in line 46 passes through open valve 48 in line 52 to T-connector 54. Vacuum solenoid 32 is in a de-energized condition dictated by switch 29 and its valve 58 is positioned to block the pressure in line 60. This causes the pressure in line 52 to be directed in line 62 to quick-connect plug-in port 64 mounted on the face of the chassis panel. Port 64 is adapted to detachably receive a flexible hydraulic hose connected to the solder extractor iron, not shown.

The vacuum circuit from pump 20 is a parallel hydraulic circuit with the pressure circuit described above. Vacuum in pump outlet 26 passes through its respective air filter 28 and through line 66 to an associated vacuum solenoid valve 68 of solenoid 32. If toggle switch is positioned in the "vacuum" position, and foot switch 30 is depressed by the operator, valve 68 will be in an open position (not illustrated) and vacuum is directed in line 60 to T-connector 54. As pressure solenoid 31 is now in a de-energized condition by toggle switch 29, and its valve 48 is closed to block the vacuum in line 52. Accordingly, the only path for the vacuum in line 60 is to line 62 and also to quick-disconnect port 64, where it is available for porting to the solder extractor iron.

Figure 4:
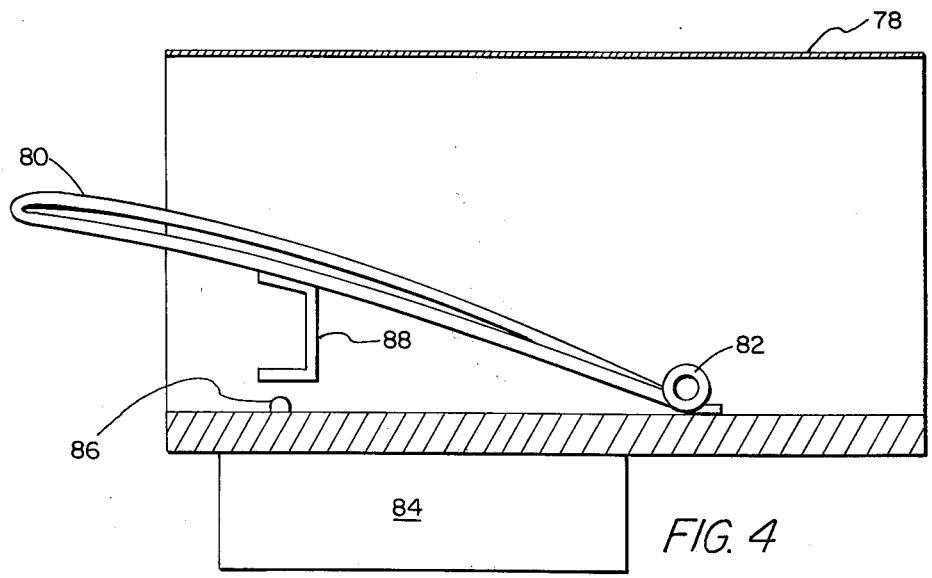
FIG. 4 is a cross section taken along line IV—IV of FIG. 3 showing the extractor iron holder microswitch.

Separate solder extractor iron holder 17 is shown in FIGS. 3 and 4, and comprises a base 70 on which is mounted a wire wound coil holder 72 having a ceramic mouthpiece 74 for receiving a conventional soldering iron, not shown. Also mounted on base 70 is a holder 76 having a perforated protective shield 78 for receiving a conventional solder extractor iron, not shown. Housed within shield 78 is a wire saddle 80 on which is adapted to rest the solder extractor iron. One end of saddle 80 is hinged at 82 to base 70. A microswitch 84 is mounted on base 70 beneath shield 78, the switch having a button 86 projecting upwardly adapted to be engaged by one end of a bracket 88 mounted to and beneath the saddle 80. When the saddle is weighted down by the presence of the extractor iron the switch is depressed to an "open" condition. Saddle 80 is spring loaded so that when the solder extractor iron is lifted by the operator off the saddle, switch button is released and the switch assumes a "closed" position. Other components mounted on base 70 is a container 90 in which is contained steel wool or the like, not shown, which container provides a depository for the molten solder that is periodically blown out of the solder extractor iron. Container 90 is detachably secured by clamp 92 for replacement. A sponge and holder 94 is also mounted on base 70, the damp sponge enabling the removal of oxidation deposits on the iron tips.

Figure 6:
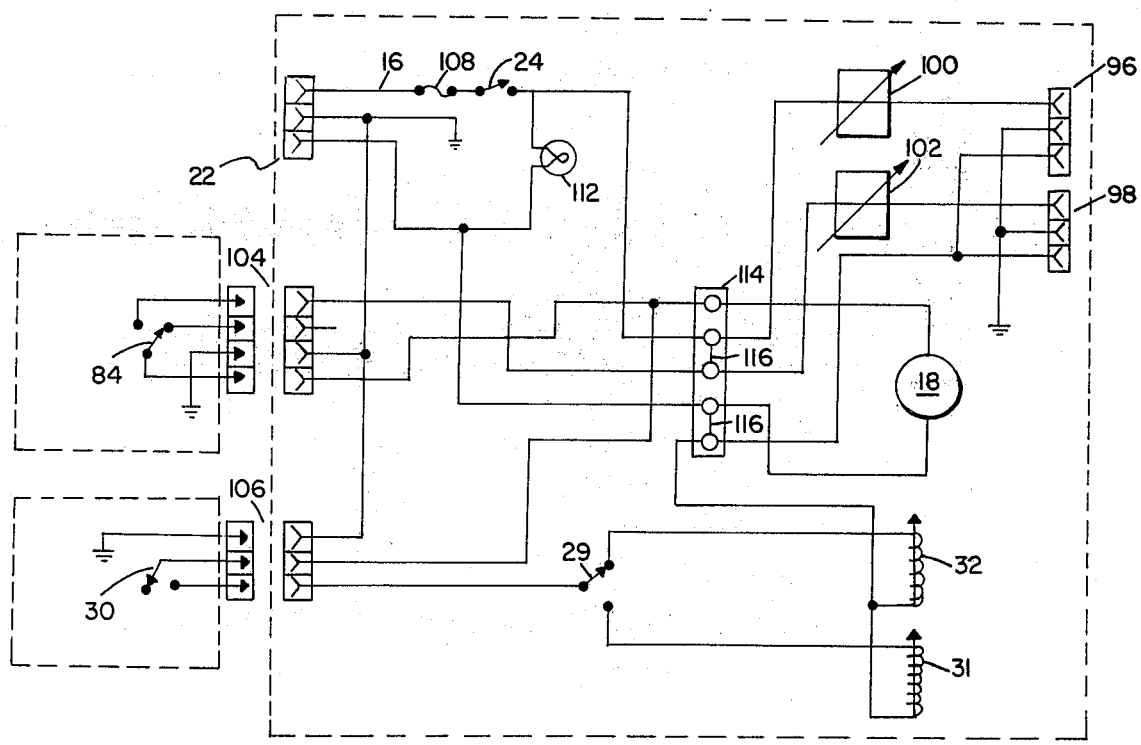
FIG. 6 is an electrical circuit diagram of the solder extractor apparatus.

An electrical circuit for the various components is illustrated in FIG. 6. Referring to FIGS. 1 and 2, conveniently located on each side of front chassis panel is a pair of electrical outlets 96 and 98 interchangeably connecting either the solder extractor iron or the solder iron depending on which location is most convenient to the operator. Each outlet is electrically connected to a respective variable "Triac" control 100 and 102 having their knobs mounted on the front panel adjacent their outlets. Controls 100 and 102 enable the temperature of both irons to be varied by the operator to meet job requirements. On the rear chassis panel 103, in addition to the 115-V input socket 22, an inlet socket 104 is provided for the electrical lead from holder microswitch 84, as well as a socket 106 for the electrical lead from foot switch 30. A pair of fuse and holders 108 and 110 are conveniently located on the chassis front panel for ready replacement, one fuse being a spare. A light indicator 112 mounted on front chassis panel is connected in the circuit to indicate when the circuit is energized.

A terminal 114 is mounted in chassis 12 (FIG. 2) and by means of jumper wires 116 provide power to outlets 96 and 98 through their respective variable controls at all times the circuit is energized. As can be seen in FIG. 6, pump motor 18 is connected across the input power in series with extractor holder microswitch 84. Microswitch 84 is designed to be in an "open" condition whenever the solder extractor iron is being supported in its holder 76, and is in a "closed" condition to complete the circuit whenever it is lifted free from its holder for use by the operator. Accordingly, the pump motor 18 is energized to develop pressure and vacuum only when the solder extractor iron is removed from its holder for use by the operator. This is an important feature of the invention. The independent availability of pressure or vacuum at the solder extractor iron by operation of the operator's foot switch 30 is another important feature of the invention.

The operation of the solder extractor apparatus is described with reference to FIGS. 5 and 6. Initial selections by the operator involves which of the outlets 96 and 98 are to be used for the solder extractor and/or the solder iron, and the appropriate voltage settings of variable controls 100 and 102. The operator also must throw toggle switch 29 to select whether he wants pressure or vacuum at the solder extractor iron when he depresses his foot switch 30. The plastic pressure/vacuum hose, not shown, is plugged into common quick disconnect port 64 (FIG. 1). Main switch 24 is closed and indicator light 112 reveals that the apparatus is energized and power is available to outlets 96 and 98 and to the irons connected thereto. Pump motor 18 and solenoids 31 and 32 are in a de-energized condition.

When the operator is ready to perform, for example, a solder extraction operation, his lifting of the extractor iron from its holder will commence pump motor operation. When the electrical connection is melted, for removal the operator depresses foot switch 30 which energizes solenoid 32 and opens its valve 58. As pump motor has been previously energized by lifting the extractor iron, a vacuum is instantaneously available at quick disconnect port 64 and as the extractor iron tip to complete the solder extraction process. There is no need, as in the prior art apparatus, to wait for the pump motor to build up to a sufficient vacuum, which can cause a further delay by cooling of the melted solder and possible circuit board degradation.

When it is necessary to unload the solder from the extractor iron into container 90, toggle switch 29 is thrown to the "pressure" position, and depressing foot switch 30 makes pressure immediately available at quick disconnect port 64 and to the tip of the extractor iron. Of course, the availability of hot air pressure flow at the extractor iron has other uses, i.e., for coating, curing, heat shrinking, de-soldering, cleaning, etc. As quick disconnect 94 is common to both pressure and vacuum, no reconnection of the solder extractor hose is necessary by the operator in changing from vacuum to pressure operation.

The solder extractor apparatus of this invention permits the extraction of solder from an electrical connection instantaneously as soon as a solder melt is obtained. This enables the solder extraction process to be expedited by elimination of various time delays, and avoids possible circuit board degradation therefrom. The solder extractor apparatus permits ready temperature adjustments of the extractor and soldering irons to accommodate varying work conditions. The de-soldering operation is further expedited by using a common pressure/vacuum port and avoiding the necessity for the operator to change connections.

Obviously many modifications and variations of the present invention are possible in the light of the above teachings. It is therefore to be understood that within the scope of the appended claims the invention may be practiced otherwise than as specifically described.

What is claimed is:

1. Solder extractor apparatus for use with a hollow solder extractor iron comprising:
    a chassis;
    an electric motor and pump assembly for generating a vacuum input and a pressure input;
    said inputs being available at a single common port on said chassis;
    means for selectively connecting one of said inputs through the port ot said solder extractor iron;
    a circuit for connecting said motor to a secure of power;
    a holder for supporting said solder extractor iron;
    a switch on said holder operable to a closed position by the absence of the solder extractor iron;
    said switch being electrically connected in said circuit with said motor;
    whereby removal of the extractor iron from its holder will close the switch and energize the motor and pump assembly making said selected input automatically available to the solder extractor iron upon the commencement of the solder extraction operation.

2. The apparatus of claim 1 wherein a solenoid and associated valve is provided for each vacuum and pressure input, and a switch is provided alternately to select the energizing of one of the solenoids.

3. The apparatus of claim 2 wherein a foot operated switch is provided electrically positioned between the source of power and the manual switch for controlling the energization of the selected solenoid.

4. The apparatus of claim 1 wherein means are provided for varying the amount of pressure flow to the solder extractor iron.

5. The apparatus of claim 1 wherein said apparatus includes a chassis having two electrical outlets, one outlet located at each left and right side of the cabinet to enable the solder extractor iron and other tools to be postioned with respect to the sides of the cabinet depending on the left hand or right hand dexterity of the operator.

6. The apparatus of claim 5 wherein a separate variable control switch is provided for each electrical outlet.

7. Solder extractor apparatus for use with a hollow solder extractor iron comprising:
    an electric motor and pump assembly for generating a vacuum input and a pressure input;
    means for selectively connecting one of said inputs to said solder extractor iron;
    means for making said selected input available upon demand including;
        a circuit for connecting said motor to a source of power,
        a solenoid and associated valve for each vacuum and pressure input,
        a selector switch for energizing alternately one of said solenoids,
        a foot operated switch for controlling the energization of the selected solenoid.

8. The apparatus of claim 7 wherein operation of the electric motor is controlled by a second switch.

* * * * *